UNITED STATES PATENT OFFICE.

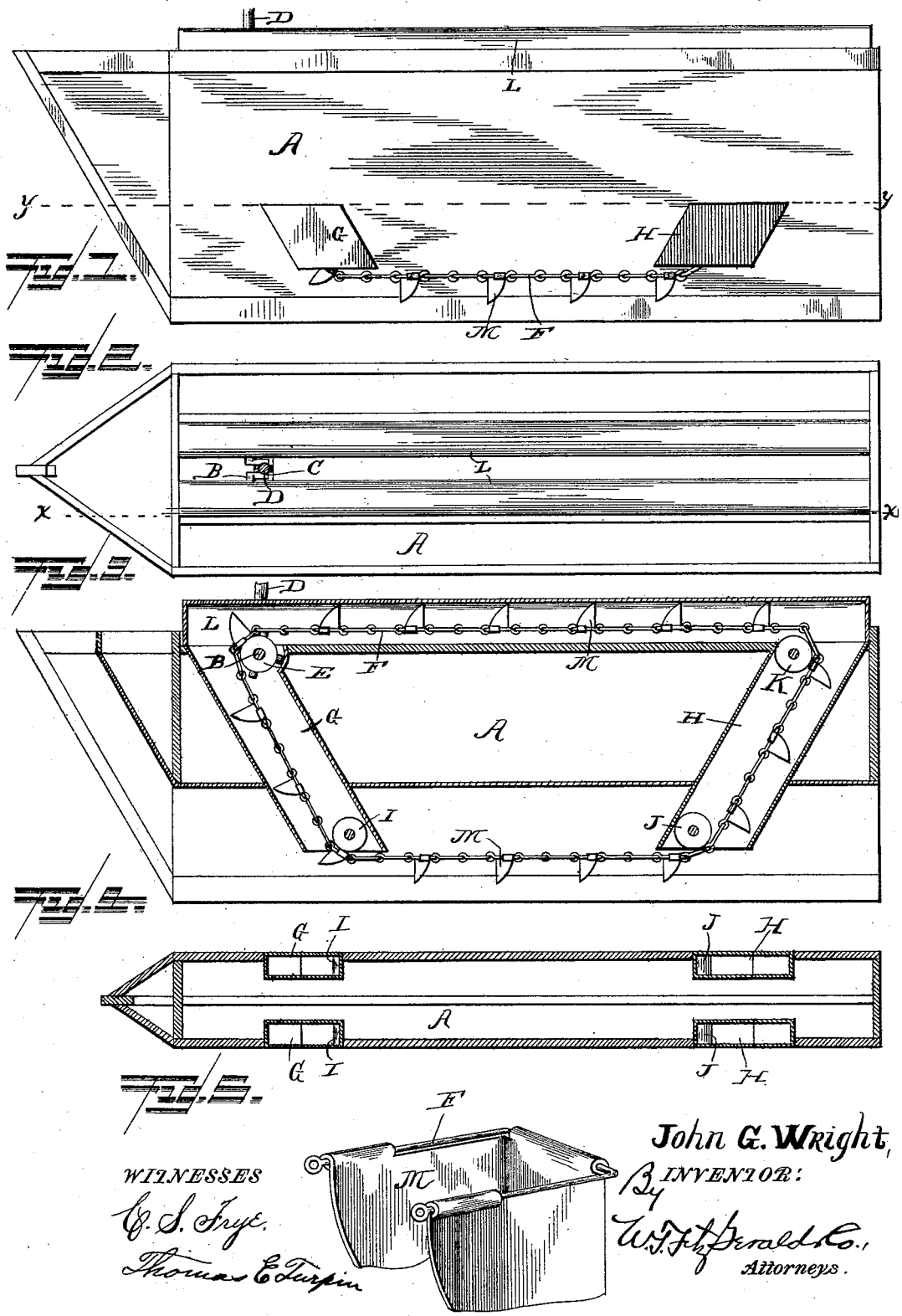
(No Model.)
J. G. WRIGHT.
CHAIN PROPELLER.
No. 484,485. Patented Oct. 18, 1892.
John G. Wright,
INVENTOR
WITNESSES

JOHN GIBSON WRIGHT, OF SPRING VALLEY, ILLINOIS.

CHAIN PROPELLER.

SPECIFICATION forming part of Letters Patent No. 484,485, dated October 18, 1892.

Application filed March 12, 1892. Serial No. 424,705. (No model.)

*To all whom it may concern:*

Be it known that I, JOHN GIBSON WRIGHT, a subject of the Queen of Great Britain, residing at Spring Valley, in the county of Bureau and State of Illinois, have invented certain new and useful Improvements in Propellers; and I do hereby declare the following to be a full, clear, and exact description of the invention, such as will enable others skilled in the art to which it appertains to make and use the same.

My invention has relation to improvements in that class of vessel-propellers known as "chain propellers;" and it consists in the peculiar construction, certain novel combinations, and the adaptation of parts hereinafter described, and particularly pointed out in the claim appended.

In the accompanying drawings, Figure 1 is a side elevation of a vessel provided with my improved propeller. Fig. 2 is a top plan view of the same. Fig. 3 is a vertical longitudinal section taken in the plane indicated by the line $x\ x$ on Fig. 2. Fig. 4 is a horizontal section taken in the plane indicated by the line $y\ y$ on Fig. 1, and Fig. 5 is a perspective view of one of the blades removed.

In the said drawings similar letter designate corresponding parts throughout the several views, referring to which—

A indicates the hull of a vessel, which in general may be of the ordinary or any approved construction. Journaled in suitable bearings and preferably in the forward portion of the hull is a transverse shaft B, which is provided adjacent to its middle with a crank branch C, to which is connected a pitman D or the like, through the medium of which the shaft is rotated by a steam-engine or other motor. Fixed upon the shaft B on opposite sides of the crank branch thereof are sprocket-wheels E, around which take the endless chain belts F, as better illustrated in Fig. 3 of the drawings. Depending from a point beneath and adjacent to the sprocket-wheels E to and through the sides of the vessel at a point adjacent to the keel thereof are conveyers G, which are pitched slightly forward, as illustrated, for a purpose presently set forth. Arranged in the same vertical plane with the conveyers G and at a suitable distance therefrom are the conveyers H which extend through the sides of the vessel adjacent to the keel thereof and are pitched slightly rearward or in an opposite direction to the conveyers G. Journaled in suitable bearings in the conveyers G, adjacent to the rear transverse side and lower end thereof, are idler-sheaves I, around which take the endless chain belts F, which also take around the idler-sheaves J, journaled in the lower end of the conveyers H, adjacent to the forward transverse side thereof and the idler-sheaves K, journaled in the upper ends of said conveyers. Fixedly mounted upon a suitable support and covering the upper ends of the conveyers G and H and the chain belts between the forward and rear conveyers are housings L, which serve in practice to conduct any water which might be raised by the propeller-blades back to the conveyers, through which it will run back into the sea. Fixedly connected at suitable intervals to the endless-chain belts F are the blades M, which extend at right angles to said belts and in practice bear against the water and force the vessel through the same. By reason of the forward conveyers being pitched forwardly and the idler-sheaves I being journaled adjacent to the rear transverse sides of said conveyers, it will be readily perceived that when the vessel is moving forwardly the blades M of the belts will take edgewise into the water and will meet with little or no resistance until they commence to move from the forward to the rear conveyers. The rear conveyers are pitched rearwardly and the idler-sheaves J are journaled in the lower ends of said conveyers adjacent to the forward transverse sides thereof, so that when the engines are reversed to back the vessel the blades M of the belts will take edgewise into the water from the rear conveyers and will meet with but little resistance, as above stated.

From the foregoing description it will be readily perceived that I have provided a chain propeller of an exceedingly cheap, simple, and efficient construction, and by reason of the blade-carrying belts being arranged so that they will take through the water adjacent to the keel of the vessel it will be perceived that no matter how the vessel rolls and rocks in a heavy sea the blades will always engage the water.

Although I have specifically described the construction and relative arrangement of the several elements of my improved propeller, yet I do not desire to be confined to the same, as such changes or modifications may be made as fairly fall within the scope of my invention.

Having thus described my invention, what I claim, and desire to secure by Letters Patent, is—

In a chain propeller for vessels, the combination, with the vessel, of the forward conveyers pitched forwardly and extending through the sides of the vessel adjacent to and upon opposite sides of the keel thereof, the rear conveyers pitched rearwardly and extending through the sides of the vessel adjacent to and upon opposite sides of the keel thereof, the transverse shaft resting at the upper ends of the forward conveyers and having a crank branch at its middle, the sprocket-wheels fixed on the transverse shaft in alignment with the forward conveyers, the sheaves journaled in the lower ends of the forward conveyers and in the lower and upper ends of the rear conveyers, the chain belts taking around the sprocket-wheels and sheaves of the conveyers, the blades connected to said belts at intervals in the length thereof, and the housings covering the upper ends of the conveyers and the chain belts between the forward and rear conveyers, substantially as specified.

In testimony whereof I affix my signature in presence of two witnesses.

JOHN GIBSON WRIGHT.

Witnesses:
GEO. L. HOFFMAN,
THOS. HUMPHRIES.